United States Patent [19]

Eltvedt

[11] 4,295,815
[45] Oct. 20, 1981

[54] GUIDE SKIRT

[76] Inventor: Frank Eltvedt, 5 Lake Dr., Lake In The Hills, Ill. 60102

[21] Appl. No.: 170,847

[22] Filed: Jul. 21, 1980

[51] Int. Cl.³ .............................................. B29F 1/14
[52] U.S. Cl. ..................................... 425/556; 425/444
[58] Field of Search ................ 425/436 RM, 444, 556, 425/436 R; 249/67, 68

[56] References Cited

U.S. PATENT DOCUMENTS

| | | | |
|---|---|---|---|
| 2,253,651 | 8/1941 | Ring | 425/444 X |
| 2,582,891 | 1/1952 | Strauss | 425/556 X |
| 2,718,662 | 9/1955 | Bohannon et al. | 425/DIG. 223 |
| 3,776,675 | 12/1973 | Veneria | 425/444 X |
| 3,805,875 | 4/1974 | Daugherty et al. | 425/444 X |
| 3,986,811 | 10/1976 | Gunnels | 425/556 |
| 4,118,168 | 10/1978 | Rees et al. | 249/68 X |

Primary Examiner—J. Howard Flint, Jr.
Attorney, Agent, or Firm—Edmond T. Patnaude

[57] ABSTRACT

A collapsible guide skirt formed of a limp, flexible fabric hangs from a pair of molds and prevents the molded parts from bouncing away as they fall to a parts receiving receptacle.

18 Claims, 8 Drawing Figures

GUIDE SKIRT

The present invention relates in general to the art of guiding parts from a part production machine to a desired location below the place from which the parts are ejected, and it relates in particular to a novel guide skirt which is adaptable for use with various sizes and types of plastic molding machines as well as for use with other types of high speed, automatic parts producing apparatus.

BACKGROUND OF THE INVENTION

When small parts are produced by high speed automatic machines such, for example, as injection molding machines and screw machines, the freshly made parts are ejected from the machines either singly or in groups. In some cases receptacles such as open top containers are placed below the ejection point of the machine while in other cases conveyors extend below the ejection point to catch the ejected parts and carry them to another location. Inasmuch as the parts are oftentimes light in weight and irregular in shape, they tend to bounce away from the receptacle or conveyor and become damaged or lost. In the case of plastic molding machines the problem is accentuated by the fact that the desired parts and the sprue pieces drop simultaneously from the molds and become intermingled. Moreover, in some cases a single pair of mold members produce different parts which are ejected and drop from the mold cavity as the mold opens.

In U.S. Pat. No. 3,986,811 there is described a foldable, open top chute which is attached to mold platens to carry molded plastic parts from beneath the molds to a conveyor. Other types of guide chutes formed of sheet metal or the like have been custom built for use with molding and other types of part producing machines but they have not been widely used because of the relatively small space available for them beneath the molds. Moreover, since there are many different molding machine designs the guide chutes of the prior art were usually custom made.

SUMMARY OF THE INVENTION

Briefly, in accordance with the teachings of the present invention there is provided a guide skirt formed of a limp, flexible material, such as a woven fabric, having its upper, open end attached to the molds so as to open and close with the molds, and its lower open end fastened in place over a part receiving conveyor or receptacle or left loose so as to simply hang over the receptacle. In either case, however, there are not intermediate supports for the skirt wherefor it may fold around machine parts located below the molds when the molds close. Also, being limp and flexible the skirt can be fitted around and between such parts. Two such skirts may be used with a multiple plate molding machine so that one skirt carries the molded parts to one location and the other skirt carries the sprue pieces to another location. In a family type mold where different parts are molded in the same mold, a limp, flexible partition is provided across the skirt whereby one part is guided to one receptacle and the other part is guided to another receptacle.

Inasmuch as the mouth of the skirt is in proximity to the molds and since the skirt completely surrounds the guide path for the molded parts, the skirt functions both as a curtain to prevent the parts from bouncing away and as a guide chute for directing the molded parts to the desired location which may or may not be directly below the molds. Being a limp, flexible skirt, the guide of the present invention may be readily fitted to most designs and sizes of machines.

In other embodiment of the invention the receptacle or conveyor is covered except for the opening through the guide. Consequently, dirt, oil, grease and the like are prevented from falling into the receptacle or conveyor.

GENERAL DESCRIPTION OF THE DRAWINGS

The present invention will be better understood by a reading of the following detailed description taken in connection with the accompanying drawings wherein.

DETAILED DESCRIPTION OF THE INVENTION

Figure 1:
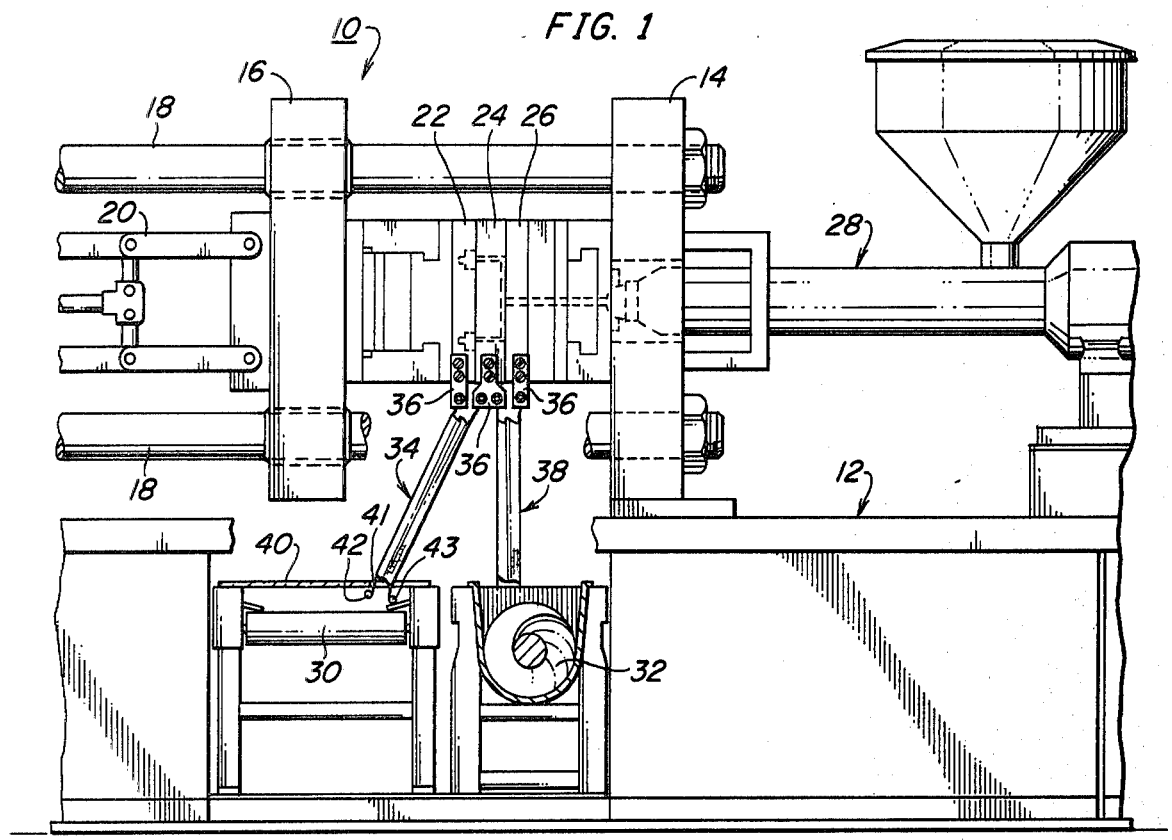
FIG. 1 is an elevational view of a portion of an injection molding machine embodying the present invention, the molds being shown in a closed position.
Figure 2:
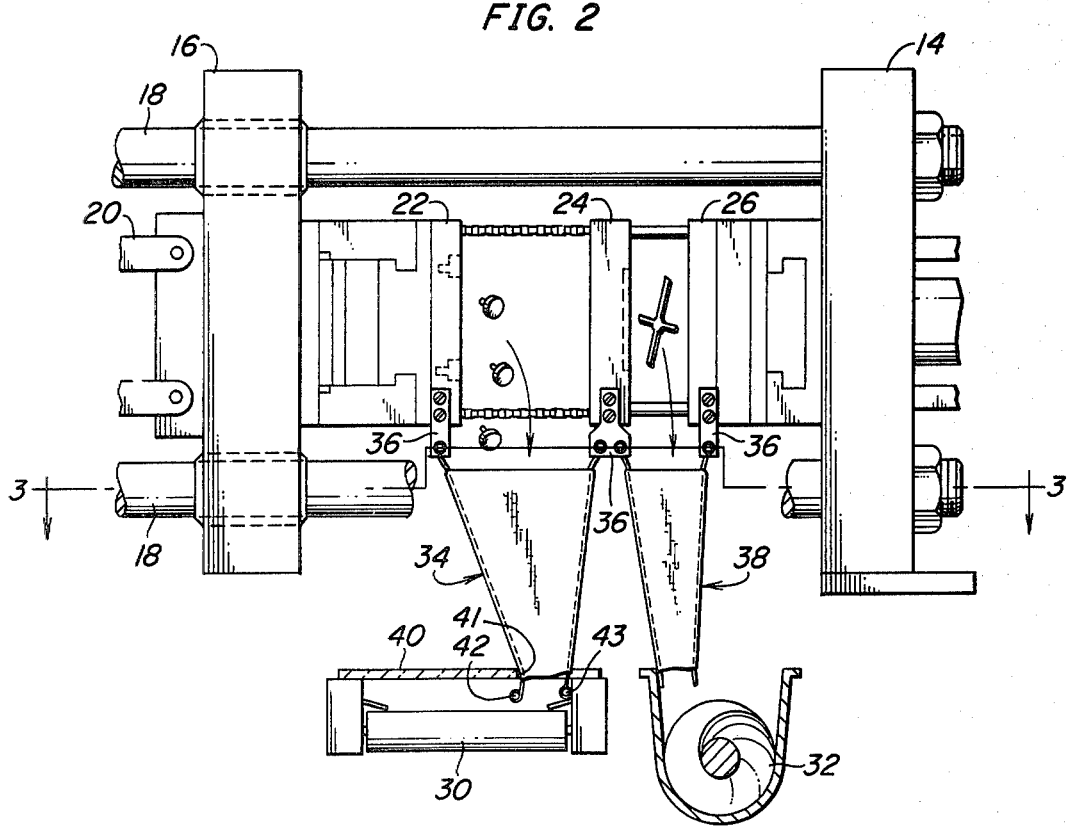
FIG. 2 is a view similar to that of FIG. 1 but showing the molds in an open, part-releasing position.
Figure 3:
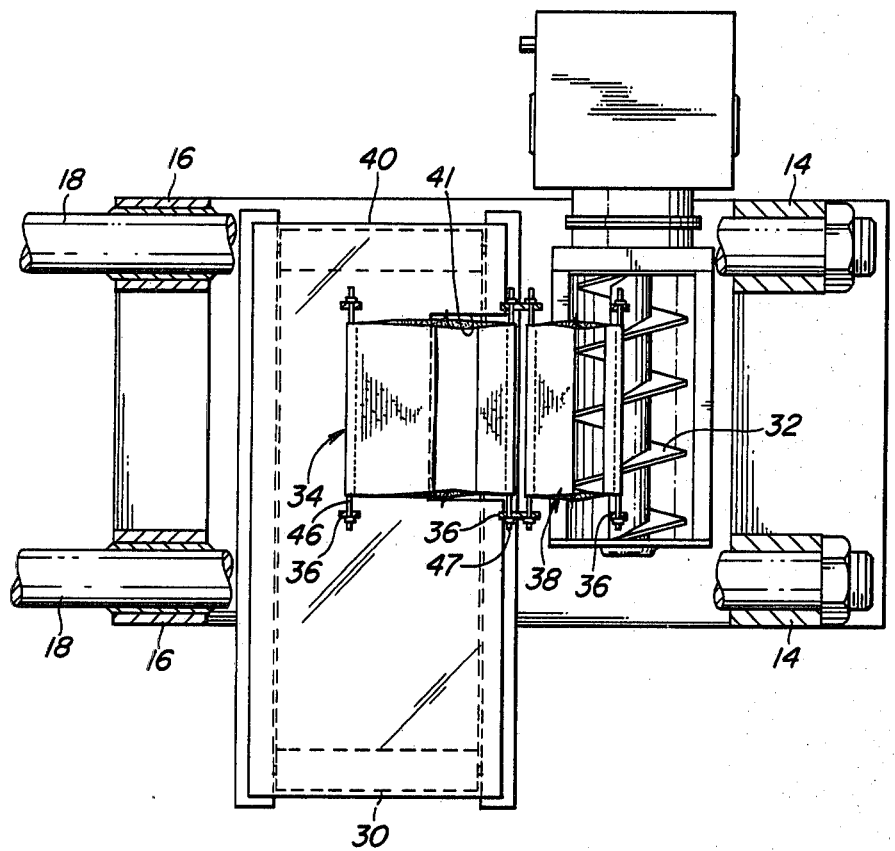
FIG. 3 is a cross-sectional view taken along the line 3—3 in FIG. 2.

Referring particularly to FIGS. 1, 2 and 3 of the drawings, there is shown a portion of a conventional injection molding machine 10 for molding plastic parts. The machine 10 includes a suitable frame 12 which carries a fixed platen 14 and a movable platen 16 carried by a plurality of support rods 18 for movement toward and away from the fixed platen 14 by means of a suitable hydraulic mechanism connected by a linkage assembly 20 to the movable platen 16. Three conventional mold members 22, 24 and 26 are mounted between and to the platens 14 and 16 in the customary manner so as to move towards and away from one another with the platens 14 and 16. The mold members 22, 24 and 26 include complimentary mold cavities into which the liquid plastic is injected from a conventional ram-type injection mechanism 28.

In FIG. 1 the mold members 22, 24 and 26 are shown in the closed, molding position while in FIG. 2 these mold members are shown in the open position during the release or ejection of the molded parts from the mold cavities. A part receiving conveyor 30 is positioned below the horizontal plane of the mold members, and a feed auger 32 is positioned along side the conveyor 30. The conveyor 30 is used to carry the molded parts to a desired location away from the machine and the auger 32 is provided for carrying the sprue pieces to a grinder or the like for reuse of the plastic contained therein.

In accordance with the present invention a generally tubular guide skirt or funnel 34 is formed of a limp flexible material and has its upper end mounted by a plurality of brackets 36 to the mold members 22 and 24. Another guide skirt 38 has its upper end connected by brackets 36 to the mold members 24 and 26. The lower end of the guide skirt 34 depends through an opening 41 in a cover plate 40 positioned over the conveyor 30 and its lower end is held in place by means of a pair of rods 42 and 43 which extend through hems at the lower end of the skirt 34 and are positioned beneath the lower surface of the cover 40.

The lower end of the sprue guide skirt 38 hangs freely over the auger 32. This is possible inasmuch as the auger is located directly below the mold parts 24 and 26 in both the open and closed positions. However, as described more fully hereinafter cords or springs may be fastened to the lower end of the guide skirts of the present invention for holding the lower end at a desired location by simply hooking the springs to proper positions on the machine or using the cords to tie the lower end at the desired location.

Inasmuch as the mouths of the guide skirts 34 and 38 are mounted to the mold members, when the mold members move to the open position and the parts are ejected or released as shown in FIG. 2, the parts and the sprue fall into the respective guide skirts wherein they are confined and directed to the respective desired locations. Neither the desired parts nor the sprue pieces can bounce or otherwise be deflected away from the respective desired locations. Consequently, none of the desired parts will fall into the auger and be lost nor will any of the sprue pieces bounce or be deflected onto the conveyor 30 and require subsequent separation. Of course, none of the parts can fall on the floor.

The guide skirt of the present invention thus enables the use of a cover over the conveyor to prevent oil, grease and other dirt from falling onto the conveyor. In some cases a container such as a box or bin is placed under the molds to collect the molded pieces as they are ejected or drop from the molds. In such cases it is also advantageous to provide a cover having an opening into which the lower end of the skirt extends, thereby minimizing the amount of oil, grease and dirt which falls into the container.

As is well known to those skilled in the art, plastic molding machinery is notoriously dirty and as a consequence the guide skirts do collect grease and other types of dirt. However, being relatively simple in construction and thus inexpensive the skirts can be readily replaced when necessary as contrasted, for example, to the relatively permanent and expensive guide chutes of the prior art.

It may be seen that inasmuch as the skirts of the present invention contain no rigid parts which extend between the mold members and the lower end thereof they can be fitted around the parts of the machine which are located below the mold members and which themselves move back and forth with the mold members. Also, because of the fact that the skirts are relatively inexpensive, being preferably a woven fabric having a plastic coating on the outer side, they can be readily cut to any desired length without any appreciable costly wastage. This reduces the required inventory which must be carried inasmuch as a few sizes and shapes of skirts can be used to fit almost all molding machines.

When the molds open, the molded parts are pushed out of the mold cavities. However, in some cases the parts may freely move out of the mold and drop straight down while in other cases they may stick in the cavity and pop out in a more or less horizontal trajectory. The guide skirt, being located directly at the mold deflects these errant parts into the receptacle or into the opening on the covered conveyor.

To facilitate an illustration of the invention only the principal parts of the machine 10 are shown in FIGS. 1 and 2, but those skilled in the art will understand that such machines ordinarily include flexible hydraulic lines and electric cables located below the molds. Moreover, in some cases these hydraulic lines and electric cables move and flex with the molds in the space below the molds above the usual parts receiving receptacle or conveyor. As is more fully described herinafter, the guide skirt of the present invention has no rigid parts between the top and bottom thereof, and as a consequence the guide skirt may be fitted between and around such lines and cables. Furthermore, being made of a limp, flexible fabric and having no vertically extending rigid parts movement of the lines and cables against the skirt as the molds open and close does not abrade or otherwise damage the lines and cables nor is the skirt itself damaged.

As may best be seen in FIG. 3, the guide chute 34 is mounted to the brackets 36 by means of a pair of rods 46 and 47 which extend through tubular hemmed portions at the mouth or top of the skirt. The skirt 38 is mounted in like manner to the brackets 36 which attach it to the mold members 24 and 26.

Figure 4:
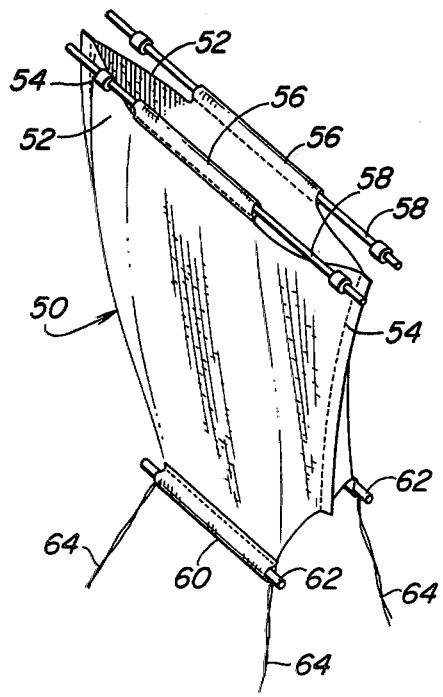
FIG. 4 is a perspective view of a guide skirt embodying the present invention.

Referring to FIG. 4, a guide skirt 50 constituting a preferred embodiment of the present invention is illustrated. As there shown, a pair of sheets 52 of fabric material or other limp, flexible material are sewn together along the vertical side edges 54. A pair of hems 56 are provided at the top to receive support rods 58, and a pair of tubular hem portions 60 are provided at the bottom to receive mounting rods 62. A plurality of cords 64 are fastend to the lower portions of the sheets 52 and may be used to tie the lower open end of the skirt to the machine over the desired receptacle. The hems at the bottom provide tubular areas in which the rods 62 may be received for use in fastening the lower end of the skirt at a desired location. While cords may be succesfully used for some applications it may be desirable to use springs or clips in place of the cords 64.

It may thus be seen that the guide skirt 50 comprises two parallel sheets with the top of each sheet being mounted to one of the mold members. The skirt 50 is sized so that the center portions of the sheets remain generally planar and parallel when the molds are fully open. As a result, the edges of the skirt do not spuriously move toward the center of the skirt where they might interfere with the flow of parts to the receiving station.

Figure 5:
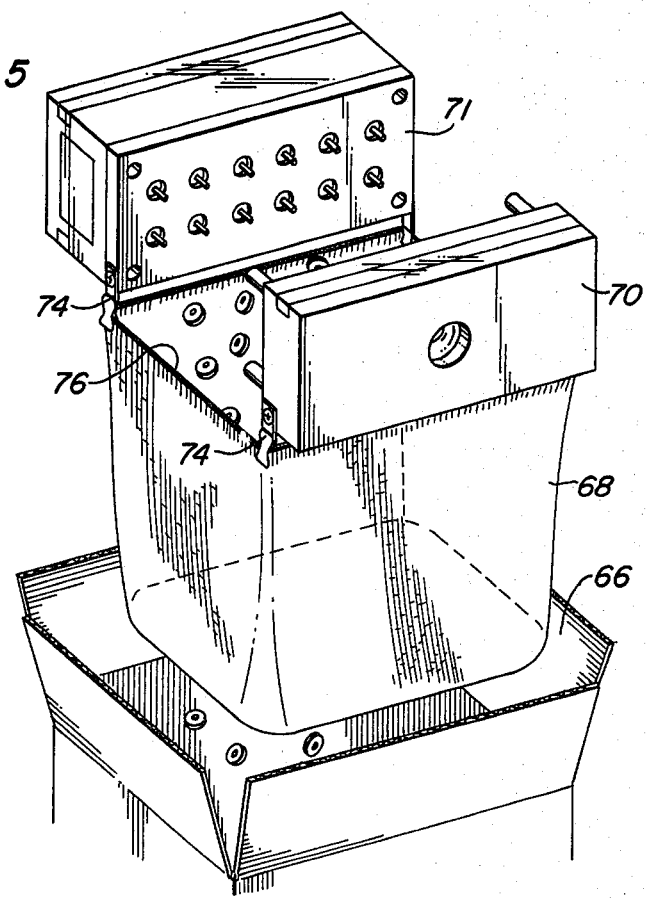
FIG. 5 is a perspective view of another embodiment of the invention.

Referring to FIG. 5, there is shown another embodiment of the invention in the form of a guide skirt 68 attached at its upper end to a pair of mold members 70 and 71. The skirt 68 is attached to the mold members 70 and 71 by means of a plurality of brackets 74, and the skirt is provided with an elastic band 76 which extends around the top of the skirt. When the mold members 70 and 71 are in the open, partreleasing position the elastic band 76 is in a stretched condition. Accordingly, when the molds close, the top of the skirt is contracted so as not to have any loose flaps which might interfere with or be caught by the adjacent portions of the machine. Also, oil and dirt cannot fall into the skirt while the molds are closed.

The lower end of the skirt 68 is positioned over a receptacle in the form of an open box 66 into which molded parts drop when the mold members open and the parts are released. While the skirt 68 is shown to have substantially vertical sides it will be understood that the skirt may be tapered so as to have a smaller opening in the bottom than at the top. One advantage of this is that material is saved thereby lowering the cost of the skirt, and in addition, the parts may be more precisely directed.

Figure 6:
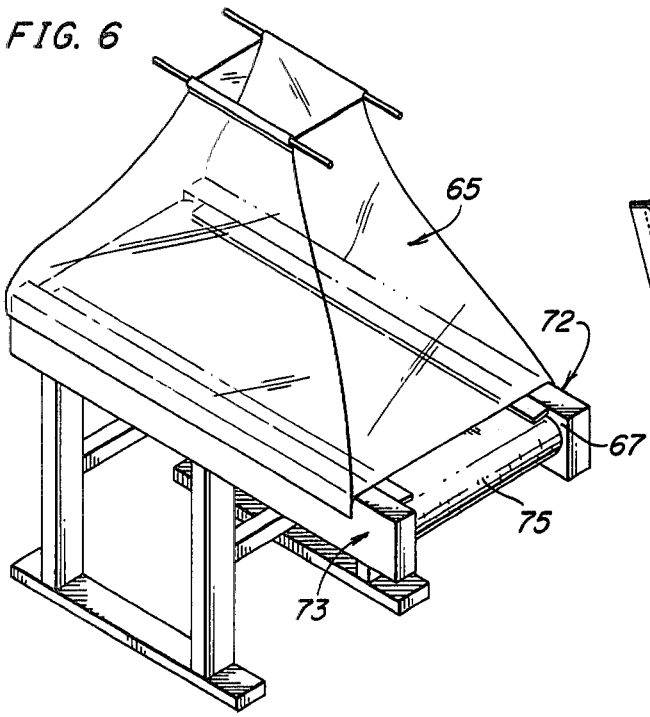
FIG. 6 is a perspective view of still another embodiment of the invention.

Referring to FIG. 6 there is shown an embodiment of the invention in the general form of an inverted, funnel shaped guide skirt 65 which overlies a substantial portion of a conveyor 75 and is connected to the side walls 72 and 73 adjacent the conveyor belt 75. The skirt 65 is formed of a limp, flexible material and is connected at the top of a pair of mold members (not shown) so that the mouth thereof opens and closes with the molds. The skirt thus functions to guide the molded parts onto the conveyor 75 and to prevent oil, dirt and the like from falling onto the conveyor. In addition, the skirt prevents the sprue from bouncing onto the conveyor. The skirt 65 may, if desired be formed of a clear, plastic film to permit viewing of the interior thereof.

Figure 7:
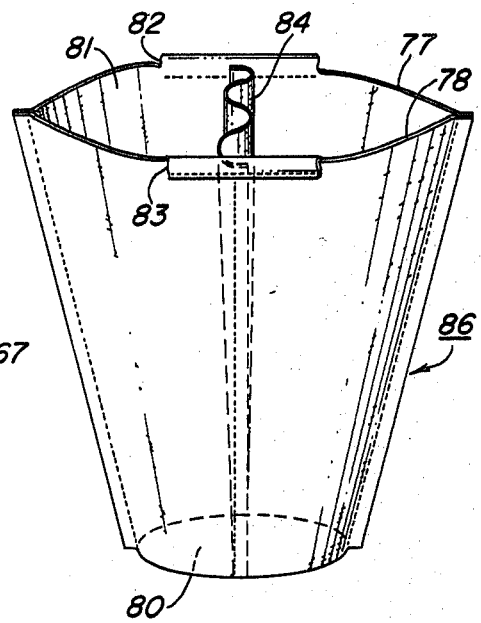
FIG. 7 is a perspective view of another guide skirt embodying the invention.

Referring to FIG. 7 there is shown a guide skirt 86 which is particularly suited for use with a family type mold wherein two differently configured parts are molded in the same mold. Such a mold generally has a plurality of cavities on one side of the mating mold members for molding one type of part and a plurality of cavities on the other side for molding another type of part. It may thus be seen that when a family type mold opens, one group of like parts falls from one side of the mold and a group of different parts falls from the other side of the mold. The skirt 86 may be used to segregate these two different type parts and guide them to separate receptacles where desired.

The guide skirt 86 comprises a pair of panels 77 and 78 which are sewn together along the vertical edges and is provided with a discharge opening 80 at the bottom and a mouth or inlet opening 81 at the top. The skirt 86 is provided with tubular openings 82 and 83 at the top for receiving support rods for attaching the skirt to the mold members. Where desired, other means for attaching the skirt 86 to the mold members may be used. Moreover, suitable means such as cords, springs or rods may be attached to the lower end portion of the skirt 86 for securing it in place relative to a receptacle such as a bin or conveyor.

The skirt 86 is formed of a limp flexible material such as a woven fabric and it includes an intermediate panel 84 which is disposed within the skirt and sewn along its vertical edges to the panels 77 and 78. While the panel 84 is illustrated as being at the center of the skirt, it will be understood by those skilled in the art that it should be located beneath the parting line between the two different types of cavities in the associated mold members. The panel 84 thus provides a divider which prevents the different types of parts from being inadvertently comingled.

Figure 8:
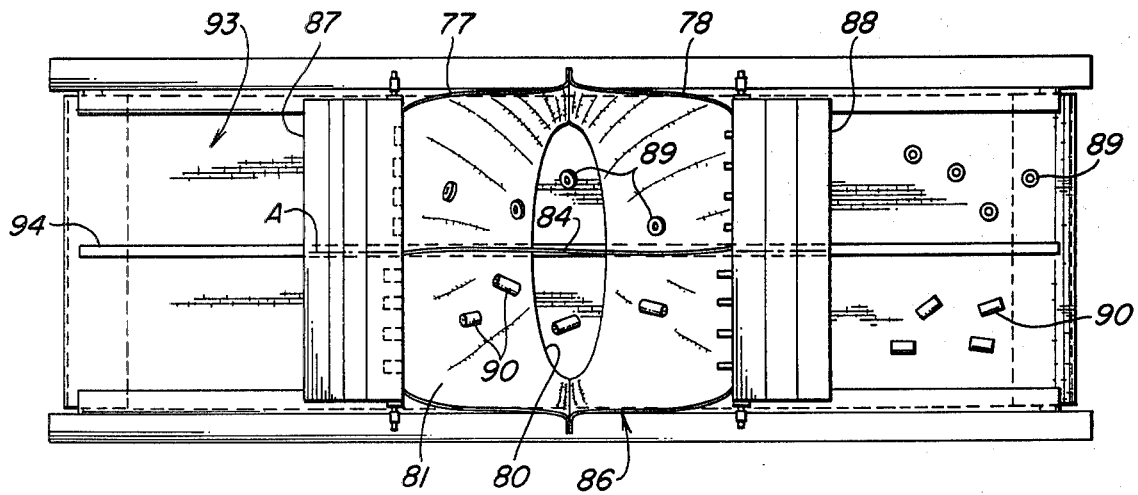
FIG. 8 is a top, cross-sectional view of a mold machine in combination with the guide skirt of FIG. 7.

Refer now to FIG. 8 wherein the skirt 86 is attached to a pair of mating mold members 87 and 88 shown in the open position. The rear side of the mold members, (upper as viewed in FIG. 8) includes cavities for molding generally disc-shaped parts 89, and the front side (bottom as viewed in FIG. 8) includes cavities for molding elongated parts 90. The cavities in which the parts 89 are molded are located rearwardly of a line A and the cavities in which the parts 90 are molded are located forwardly of the line 91. Consequently, the divider panel 84 is aligned with the line A so that the parts 89 fall out the bottom to one side of the panel 84 and the parts 90 fall out the bottom to the other side of the panel 84. Two separate receptacles may be respectively mounted below the opening 80 on opposite sides of the panel 84, or a single conveyor belt 93 having an intermediate separator wall 94 is provided for preventing comingling of the parts 89 and 90 when they drop onto the conveyor belt and are carried by the belt away from the molding machine in the segregated condition.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. Apparatus for producing parts and for ejecting said parts from an ejection location, comprising
    receptacle means mounted below said ejection location, and
    a generally tubular, limp flexible skirt mounted to said apparatus with a top opening disposed below and in proximity to said ejection location and with a bottom opening opening into said receptacle.

2. Molding apparatus, comprising in combination,
    a pair of support members mounted for relative movement toward and away from each other,
    a pair of complimentary mold members respectively mounted on said support members for movement between a closed contiguous position for molding an article therebetween and an open, separated position for allowing the molded article to drop therefrom,
    guide means mounted to said mold members for guiding molded articles dropped from said mold members to an article receiving station located below said mold members,
    said guide means comprising a generally tubular skirt formed of a limp, flexible material and having an article receiving mouth at the top and an article outlet at the bottom, and
    means connecting the upper end of said guide means to said mold members.

3. Molding apparatus according to claim 2, comprising
    a cover member mounted over said article receiving station and having an opening therein, and
    the bottom portion of said skirt depending through said opening.

4. Molding apparatus according to claim 3, comprising
    at least one elongated, rigid member secured to said skirt and disposed beneath said cover in juxtaposition with the bottom side of said cover.

5. Molding apparatus according to claim 3 wherein said article receiving station comprises a conveyor.

6. Molding apparatus according to claim 3 comprising
    upright side walls disposed on opposite side of said conveyor,
    said cover member being mounted to said side walls above said conveyor.

7. Molding apparatus according to claim 2 wherein said tubular skirt is tapered inwardly from the top to the bottom.

8. Molding apparatus according to claim 2 wherein said tubular skirt comprises first and second limp, flexible sheets sewn together along the upwardly extending edges.

9. Molding apparatus according to claim 8 wherein said sheets are respectively provided at the top with horizontally extending tubular portions, and a pair of rigid support rods extending through said tubular portions and respectively mounted to said molds.

10. Molding apparatus as set forth in claim 2, further comprising a plurality of cords extending from said skirt near said article outlet for securing said outlet at a desired location over said article receiving station.

11. Molding apparatus as set forth in claim 2 comprising an elastic band being in a stretched condition when said mold members are in said open, separated position.

12. Molding apparatus according to claim 2 comprising a third support member mounted for relative movement toward and away from one of said pair of support members, a third mold member mounted on said third support member for movement between a closed position contiguous with said one of said pair of support members and an open separated position for allowing a molded sprue to drop therefrom, and a second guide means mounted to said third mold member and said one of said pair of support members for guiding said sprue to another receiving station, said guide means comprising a generally tubular skirt formed of a limp, flexible material.

13. Molding apparatus according to claim 12 wherein said another receiving station comprises as auger.

14. Molding apparatus according to claim 2 comprising a separator formed of a limp, flexible material extending across said skirt.

15. Molding apparatus according to claim 14 wherein the upper end of said separator extends substantially in the direction of movement of said mold members when said mold members are in an open, part-releasing position.

16. Molding apparatus according to claim 2 comprising a receptacle disposed below said mold members and wherein said guide means is secured to said receptacle over the top thereof.

17. Molding apparatus according to claim 16 wherein said outlet is larger in cross-sectional area than is said mouth.

18. Molding apparatus according to claim 17 wherein said receptacle is a conveyor having side walls, and said skit is attached to said side walls.

* * * * *